United States Patent
Kwon et al.

(10) Patent No.: US 9,428,171 B2
(45) Date of Patent: Aug. 30, 2016

(54) CONTROL SYSTEM OF HYBRID VEHICLE AND METHOD THEREOF

(71) Applicants: Hyundai Motor Company, Seoul (KR); Kia Motors Corporation, Seoul (KR)

(72) Inventors: Giyoung Kwon, Seoul (KR); Seunghan Lee, Gyeonggi-Do (KR); Seongik Park, Seoul (KR); Jongbum Oh, Gyeonggi-Do (KR); Woo-Suk Choi, Gyeonggi-Do (KR); Ilkwon Park, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 14/562,732

(22) Filed: Dec. 7, 2014

(65) Prior Publication Data
US 2016/0059841 A1 Mar. 3, 2016

(30) Foreign Application Priority Data
Sep. 2, 2014 (KR) .................. 10-2014-0116252

(51) Int. Cl.
*B60W 10/06* (2006.01)
*B60K 6/442* (2007.10)
(Continued)

(52) U.S. Cl.
CPC .............. *B60W 10/06* (2013.01); *B60K 6/44* (2013.01); *B60W 10/08* (2013.01); *B60W 10/26* (2013.01);
(Continued)

(58) Field of Classification Search
CPC .......... B60K 6/442; B60K 6/48; B60K 6/42; F02D 31/005; G05D 13/0255; B60W 10/06

USPC ................. 701/22, 113; 477/97; 60/284; 123/339.11
See application file for complete search history.

(56) References Cited

U.S. PATENT DOCUMENTS 6,189,317 B1* 2/2001 Yasui .................. B60K 6/42
123/670
6,192,311 B1* 2/2001 Yasui .................. G05B 13/0255
123/350

(Continued)

FOREIGN PATENT DOCUMENTS

JP 2005-513988 A 5/2005
JP 2014-133457 A 7/2014

(Continued)

OTHER PUBLICATIONS

Y. Daniel, "Hyundai Motor to Release Sonata Hybrid in Ecuador", Korea IT Times, (May 14, 2014).

*Primary Examiner* — Yuri Kan
(74) *Attorney, Agent, or Firm* — Mintz Levin Cohn Ferris Glovsky and Popeo, P.C.; Peter F. Corless

(57) ABSTRACT

A control system of a hybrid vehicle includes: an engine that generates power by burning fuel; a driving motor that assists the power from the engine by generating power using electricity supplied from a battery; an integrated starter-generator that starts the engine and charges the battery by operating selectively as a power generator; an atmospheric sensor that measures the atmospheric pressure; a temperature sensor that measures the temperature of intake air flowing into the engine; and a controller that calculates a control factor, using the atmospheric pressure measured by the atmospheric sensor and the temperature of intake air measured by the temperature sensor, and adjusts a State of Charge (SOC) charge band between an SOC where charging the battery is started and an SOC where a hybrid vehicle runs in a charge mode, in accordance with the magnitude of the control mode.

9 Claims, 2 Drawing Sheets

(51) Int. Cl.
  *B60K 6/48*     (2007.10)
  *B60W 20/00*    (2016.01)
  *B60W 10/08*    (2006.01)
  *B60W 10/26*    (2006.01)
  *B60K 6/44*     (2007.10)

(52) U.S. Cl.
  CPC ........ *B60W 20/108* (2013.01); *B60W 2420/00* (2013.01); *B60W 2550/12* (2013.01); *B60W 2550/142* (2013.01); *B60W 2710/065* (2013.01); *B60W 2710/083* (2013.01); *B60W 2710/244* (2013.01); *Y10S 903/905* (2013.01); *Y10S 903/906* (2013.01); *Y10S 903/907* (2013.01); *Y10S 903/93* (2013.01)

(56) References Cited

U.S. PATENT DOCUMENTS

| | | | |
|---|---|---|---|
| 6,209,517 B1* | 4/2001 | Yasui | F02D 31/005 123/329 |
| 2009/0105043 A1* | 4/2009 | Muta | B60K 6/442 477/97 |
| 2012/0185119 A1* | 7/2012 | Abe | B60K 6/48 701/22 |

FOREIGN PATENT DOCUMENTS

| | | |
|---|---|---|
| KR | 10-2012-0000952 A | 1/2012 |
| KR | 10-1371463 B1 | 3/2014 |

\* cited by examiner

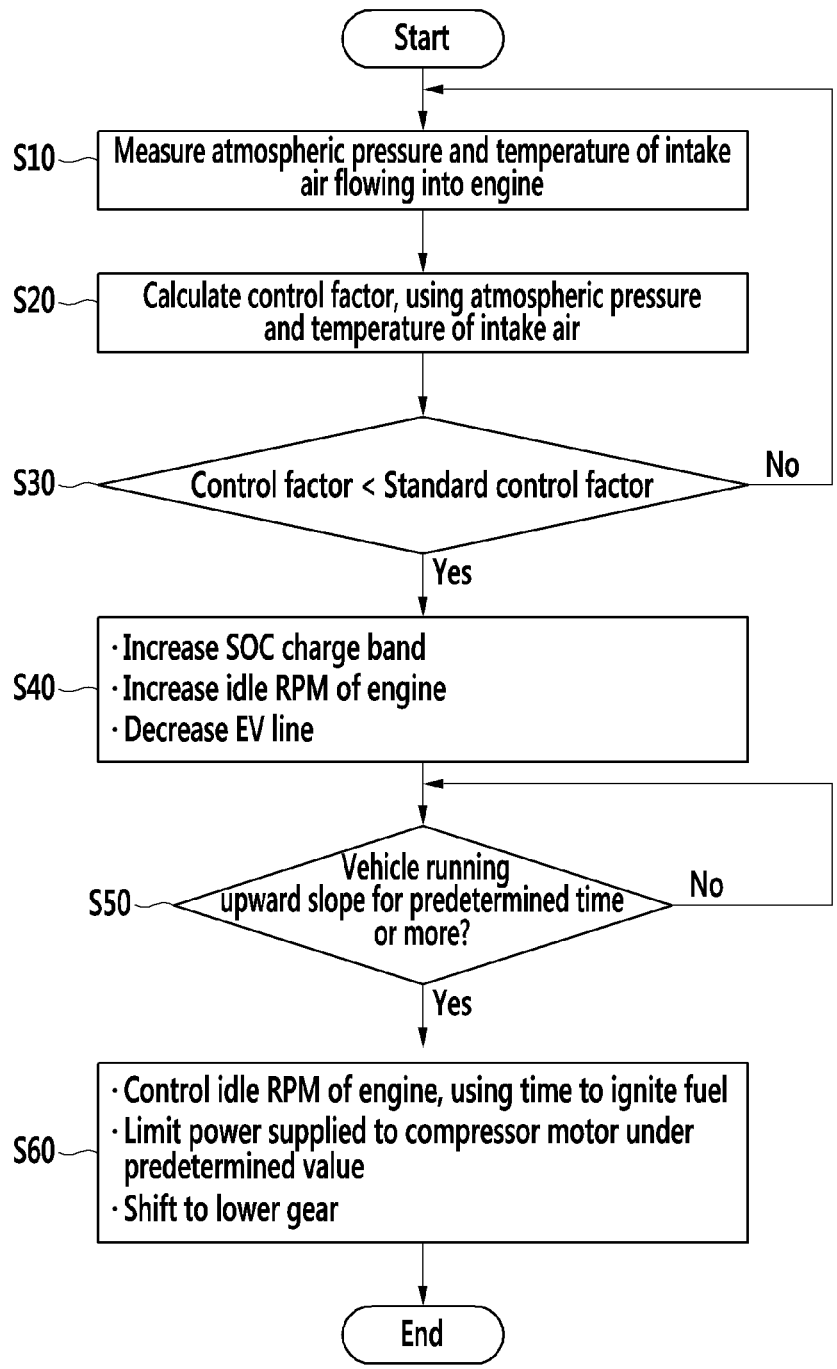

CONTROL SYSTEM OF HYBRID VEHICLE AND METHOD THEREOF

CROSS-REFERENCE TO RELATED APPLICATION

This application claims under 35 U.S.C. §119(a) priority to and the benefit of Korean Patent Application No. 10-2014-0116252 filed in the Korean Intellectual Property Office on Sep. 2, 2014, the entire contents of which are incorporated herein by reference.

BACKGROUND (a) Field of the Invention

The present invention relates to a control system of a hybrid vehicle and a control method, more particularly, to a control system which can improve fuel efficiency and secure available power of a driving motor in a vehicle that is running in a high elevated area, without a hardware change, and a method thereof.

(b) Description of the Related Art

A hybrid vehicle refers to a vehicle with an internal combustion engine and an electric vehicle, and which uses two or more power sources, for example, power of an engine and power of a battery.

When such a hybrid vehicle runs in a high elevated area, the density of the air sucked into the engine is low, so the power from the engine decreases. It is known that as an altitude increases by 1000 m, the power from an engine generally decreases by 10%.

Accordingly, since the power from an engine decreases in a high elevated area in comparison to a flatland, for the same necessary torque, the decreased power of the engine is compensated by operating a driving motor.

However, when a driving motor continuously operates, the SOC (State Of Charge) of a battery is reduced, and when the power from an engine is used to charge the battery, it takes more time to charge the battery, as compared with when a vehicle runs on the ground at sea level.

Further, as the battery takes more time to charge, the SOC of the battery is decreased by continuous operation of the driving motor, such that the roadability of the vehicle running in a high elevated area decreases. In particular, the term "roadability" refers to the ability of the hybrid vehicle to maintain a steady, balanced, and comfortable ride under a variety of road conditions.

In order to solve those problems in the related art, a method of changing the final gear ratio was used, but there is a need for a hardware change to change the final gear ratio, resulting in an increase in manufacturing cost of a vehicle.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to improve roadability of a hybrid vehicle running in a high elevated area and also improve fuel efficiency of the vehicle.

Further, the present invention can reduce the manufacturing cost of a hybrid vehicle by changing a control method of the hybrid vehicle without a hardware change, when there is a need for improving roadability of a hybrid vehicle running in a high elevated area.

An exemplary embodiment of the present invention provides a control system of a hybrid vehicle which includes: an engine that generates power by burning fuel; a driving motor that assists the power from the engine by generating power using electricity supplied from a battery; an integrated starter-generator that starts the engine and charges the battery by operating selectively as a power generator; an atmospheric sensor that measures atmospheric pressure; a temperature sensor that measures a temperature of intake air flowing into the engine; and a controller that calculates a control factor, using the atmospheric pressure measured by the atmospheric sensor and the temperature of intake air measured by the temperature sensor, and adjusts an SOC (State of Charge) charge band between an SOC where charging the battery is started and an SOC where a hybrid vehicle runs in a charge mode, in accordance with the magnitude of the control mode.

The control factor may be calculated by multiplying the atmospheric pressure by a pressure weight value and multiplying the temperature of intake air by a temperature weight value.

The pressure weight value may be larger than the temperature weight value.

The smaller the control factor than a standard control factor, the more the controller may increase the SOC charge band step by step.

The controller may increase power for charging the battery by increasing an idle RPM of the engine, when the control factor is smaller than the standard control factor.

When the control factor is smaller than the standard control factor, the controller may decrease an EV line and the EV line may be output torque for operating the engine in an EV mode in accordance with torque requested by a driver.

The system may further include: a slope sensor measuring an inclination of a vehicle; and an air-conditioning system including a compressor that compresses a refrigerant and a compressor motor that operates the compressor, in order to control the internal temperature of a vehicle, in which when it is determined that the control factor is smaller than a standard control factor and a vehicle is running on an upward slope for a predetermined time or more through the slope sensor, the controller control an idle RPM of the engine by adjusting the time to ignite fuel flowing into a combustion chamber of the engine, when the control factor is smaller than the standard control factor.

When it is determined that the control factor is smaller than the standard control factor and a vehicle is running on an upward slope for a predetermined time or more through the slope sensor, the controller may limit power supplied to the compressor motor from the battery under a predetermined value.

When it is determined that the control factor is smaller than the standard control factor and a vehicle is running on an upward slope for a predetermined time or more through the slope sensor, the controller may shift to a lower gear.

As described above, according to the control system of a hybrid vehicle of an exemplary embodiment of the present invention, when a hybrid vehicle runs in a high elevated area, it is possible to improve roadability and fuel efficiency in the high elevated area by changing a control method.

Further, as the roadability and fuel efficiency in a high elevated area are improved by changing a control method without a hardware change, it is possible to reduce the manufacturing cost of a vehicle.

BRIEF DESCRIPTION OF THE DRAWINGS

The drawings are provided for reference in describing exemplary embodiments of the present invention and the spirit of the present invention should not be construed only by the accompanying drawings.

FIG. 1 is a conceptual diagram showing a control system of a hybrid vehicle according to an exemplary embodiment of the present invention.

FIG. 2 is a flowchart illustrating a control method of a hybrid vehicle according to an exemplary embodiment of the present invention.

DETAILED DESCRIPTION OF THE EMBODIMENTS

Figure 1:
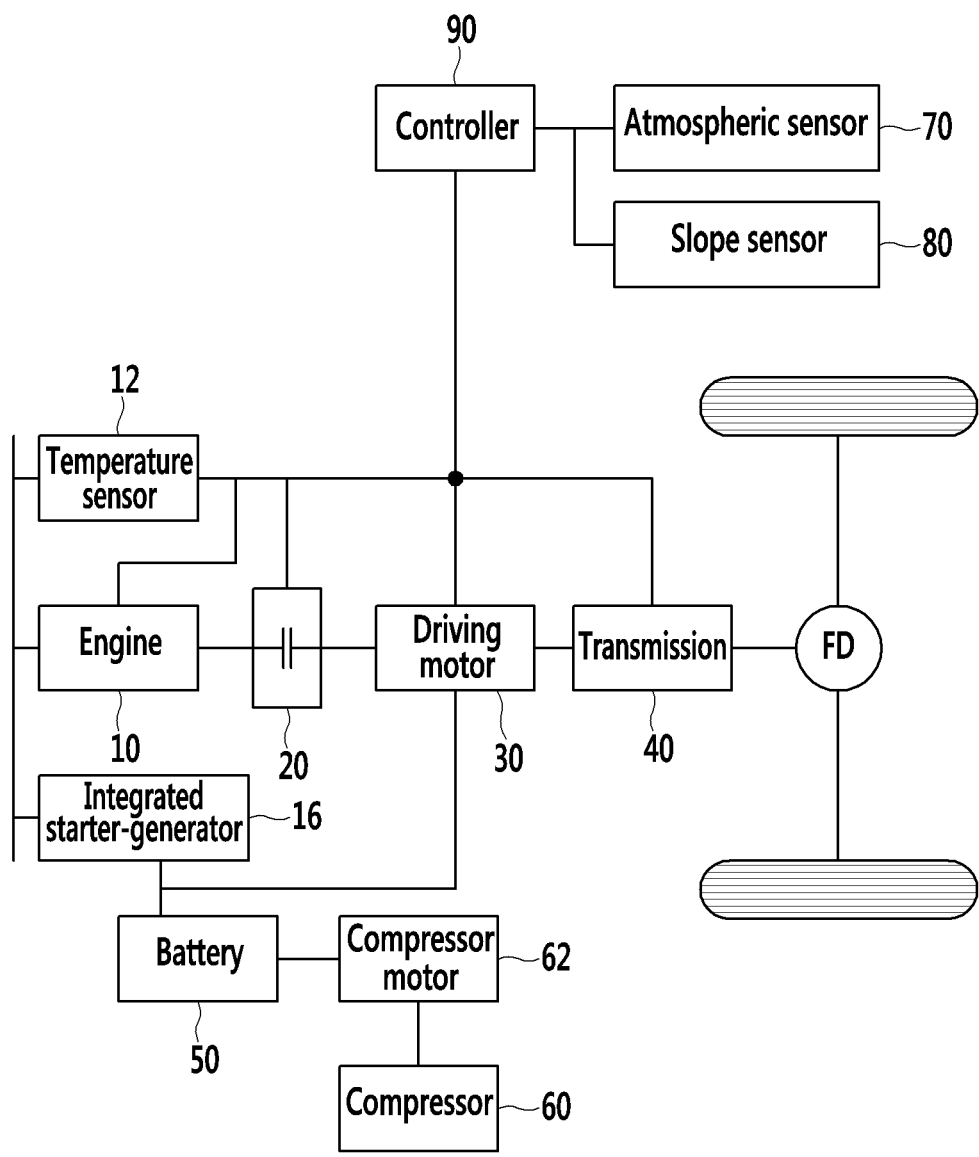

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The parts not related to the description of the exemplary embodiments are not shown to make the description clear and like reference numerals designate like elements throughout the specification.

The sizes and thicknesses of the configurations shown in the drawings are provided selectively for the convenience of description, such that the present invention is not limited to those shown in the drawings and the thicknesses are exaggerated to make some parts and regions clear.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

A hybrid vehicle, which uses two or more power sources, can be a hybrid electric vehicle generally driven by an engine 10 and a driving motor 30. Hybrid vehicles can be manufactured in various structures using two or more power sources of the engine 10 and the driving motor 30.

A TMED (Transmission Mounted Electric Device) type of powertrain to which the driving motor 30, a transmission 40, and a driveshaft are connected in series is generally used in hybrid electric vehicles. A clutch 20 is disposed between the engine 10 and the driving motor 30, and hybrid electric vehicles are driven in an EV (Electric Vehicle) mode of an HEV (Hybrid Electric Vehicle) mode in accordance with whether the clutch 20 is engaged or not.

When the drive mode of hybrid vehicles is classified in more detail, it may fall into the HEV mode, the EV mode, and a charge mode.

The HEV mode is a mode in which a vehicle runs using power from the engine 10 and power from the driving motor 30. In this mode, the clutch 20 between the engine 10 and the driving motor 30 is engaged and the vehicle is driven by the power from the engine 10 and the driving motor 30.

The EV mode is a mode in which a vehicle runs using only the power from the driving motor 30. In this mode, the clutch 20 between the engine 10 and the driving motor 30 is disengaged and the vehicle is driven only by the power from the driving motor 30 with the engine 10 stopped.

The charge mode is a mode in which a vehicle runs using only the power from the driving motor 30. Simultaneously, the engine 10 keeps operating and charges the battery 50 while idling. The charge mode also may be considered a type of EV mode.

The following description of a control system of a hybrid vehicle according to an exemplary embodiment of the present invention exemplifies a TMED type of hybrid vehicle. However, the present invention is not limited thereto and may be applied to other types of hybrid vehicles.

FIG. 1 is a conceptual diagram showing a control system of a hybrid vehicle according to an exemplary embodiment of the present invention.

As shown in FIG. 1, a control system of a hybrid vehicle according to an exemplary embodiment of the present invention includes: an engine 10 that generates power by burning fuel; a driving motor 30 that assists the power from the engine 10 by generating power using electricity supplied from a battery 50; an integrated starter-generator 16 that starts the engine 10 and charges the battery 50 by operating selectively as a power generator; an atmospheric sensor 70 that measures the atmospheric pressure; a temperature sensor 12 that measures the temperature of external air flowing into the engine 10; and a controller 90 that controls these components.

The integrated starter-generator 16 is also called an HSG (hybrid starter & generator) or an ISG (integrated starter & generator).

The controller 90 may be implemented by one or more processors operated by a predetermined program, in which the predetermined program is set to perform steps of the control method of a hybrid vehicle according to an exemplary embodiment of the present invention.

The atmospheric pressure sensed by the atmospheric sensor 70 and the temperature of intake air flowing into the engine 10 sensed by the temperature sensor 12 are supplied to the controller 90.

The controller 90 calculates a control factor C, using the atmospheric pressure sensed by the atmospheric sensor 70 and the temperature of the intake air sensed by the temperature sensor 12. The control factor is calculated by multiplying a pressure factor P, which is obtained by multiplying the atmospheric pressure sensed by the atmospheric sensor 70 by a first weight value w1, by a temperature factor T, which is obtained by multiplying the temperature of intake air sensed by the temperature sensor 12 by a second weight value w2.

The method of calculating the control factor is expressed as the following Equation 1.

$$C=(w1*P)*(w2*C) \qquad \text{[Equation 1]}$$

where C is the control factor, P is the atmospheric pressure, T is the temperature of intake air, w1 is the pressure weight value, and w2 is the temperature weight value. The pressure weight value w1 is set to 80% and the temperature weight value w2 is set to 20% in an exemplary embodiment of the present invention, but they are not limited thereto.

However, the pressure weight value w1 may be set larger than temperature weight value w2. In general, as the altitude from the ground increases, the temperature and the atmospheric pressure decrease. However, since the temperature is greatly influenced by seasons, the pressure weight value is set larger than the temperature weigh value. The control method of a hybrid vehicle according to an exemplary embodiment of the present invention is performed in accordance with the control factor.

Hereinafter, the control method of a hybrid vehicle according to an exemplary embodiment of the present invention is described in detail with reference to FIG. 2.

First, the atmospheric pressure is measured by the atmospheric sensor 70 (S10) and the temperature of air flowing into the engine 10 is measured by the temperature sensor 12 (S10). The measured atmospheric pressure and the measured temperature of air are supplied to the controller 90.

The controller 90 calculates a control factor, using the measured atmospheric pressure and temperature. The control factor is, as described above, calculated by multiplying the measured atmospheric pressure and temperature by the weight values.

The controller 90 determines whether to perform the control method of a hybrid vehicle according to an exemplary embodiment of the present invention on the basis of the control factor. When the control factor is smaller than a control factor for the ground at sea level (hereafter, referred to as a 'standard control factor'), an SOC charge band is adjusted in accordance with the magnitude of the control factor (S40). In particular, the smaller the control factor than the standard control factor, the more the SOC charge band is increased step by step.

The term "SOC charge band" refers to a range from the SOC where charging the battery 50 is started to the SOC where charging the battery 50 is finished, in the EV mode.

For example, when a hybrid vehicle runs on the ground at sea level in the EV mode, the control factor has a value of about 1. In this case, when the SOC is 45%, the hybrid vehicle runs while charging the battery 50 (that is, it runs in the charge mode), and when the SOC reaches 55%, it stops the engine and runs in the EV mode.

When the SOC decreases and reaches to 45% while the hybrid vehicle runs in the EV mode, the hybrid vehicle runs in the charge mode in which it runs while charging the battery 50. Accordingly, the SOC charge band in this case is 45~55%.

However, when a hybrid vehicle runs in a high elevated area, the atmospheric pressure and the temperature of the intake air become lower, so the value of the control factor decreases. For example, when the value of the control factor is 0.75, the SOC charge band can be increased by 5%.

When the value of the control factor is 0.5, the SOC where charging the battery 50 is started and the SOC where the hybrid vehicle starts to run in the charge mode each may be increased by 10%.

Since the power of the engine 10 decreases, when a hybrid vehicle runs in a high elevated area, as described above, it is required to secure available power of the driving motor 30 by securing sufficient SOC by increasing the SOC charge band.

Further, when the control factor is smaller than the standard control factor, that is, when a hybrid vehicle runs in a high elevated area, the controller 90 increases the power for charging the battery 50 by increasing an idle RPM of the engine (S40). The idle RPM of the engine 10 means an RPM of the engine 10 for charging the battery 50 in the charge mode.

For example, a hybrid vehicle runs on the ground at sea level and there is a need for charging the battery 50, the controller 90 maintains the idle RPM (Revolution Per Minute) of the engine 10 at 1300 RPM and charges the battery 50.

However, when a vehicle runs on the ground at an altitude of 1000 m or more, the power of the engine 10 decreases, so the controller increases the idle RPM of the engine 10 to 1500~1600 RPM and charges the battery 50. As described above, when the idle RPM of the engine 10 increases, the torque of the engine 10 increases, and accordingly, it is possible to reduce the time to be taken to charge the battery 50.

When the measured altitude of a ground is higher than a predetermined altitude, that is, when the control factor is smaller than the standard control factor, the controller 90 determines output torque for operating the engine in the EV mode in accordance with torque requested by a driver (S40).

For example, when a hybrid vehicle runs on the ground at sea level, it is assumed that the output of the driving motor 30 is 50 kw at an SOC of 50% of the battery 50. When the torque requested by a driver is smaller than 50 kw, the hybrid vehicle runs in the EV mode.

When the torque requested by a driver is 70 kw, higher than 50 kw, the controller 90 starts the engine 10 and the vehicle travels by using power of the engine 10 and the driving motor 30. In particular, an EV line that is the point of time where the engine 10 is started in accordance with the request by the driver is 50 kw. However, when the hybrid vehicle runs in a high elevated area, the controller 90 decreases the EV line by a predetermined value. For example, the controller 90 decreases the output torque for operating the engine in the EV mode from 50 kw to 30 kw.

In particular, in a high elevated area, when the torque requested by a driver is smaller than 30 kw, the hybrid vehicle runs in the EV mode, and when the torque requested by a driver is larger than 30 kw, the vehicle runs in the HEV mode by operating the engine.

In this way, it is possible to secure SOC and hybrid roadability of a hybrid vehicle running in a high elevated area.

The control system of a hybrid vehicle according to an exemplary embodiment of the present invention may further include a slope sensor 80 measuring an inclination of a vehicle. The inclination measured by the slope sensor 80 is sent to the controller 90.

When a hybrid vehicle runs in a high elevated area in the charge mode, the controller 90 controls the idle RPM of the engine 10, using the time to ignite fuel flowing into the cylinder block (S40). The idle RPM of the engine 10 means an RPM of the engine 10 for charging the battery 50 in the charge mode.

In general, when a hybrid vehicle runs on a flatland at sea level, the controller 90 controls the idle RPM of the engine 10, using the integrated starter-generator 16.

In detail, the torque from the engine 10 may be divided into friction torque of the engine 10 and torque for charging the battery 50. When the idle RPM of the engine 10 changes, the torque outputted from the engine 10 changes. In order to keep the idle RPM of the engine constant, the torque for charging the battery is assisted by the integrated starter-generator 16, and accordingly, the idle RPM of the engine 10 is kept constant.

However, when a hybrid vehicle runs on an upward slope for a predetermined time or more in a high elevated area, it is required to charge the battery 50 first, rather than considering the fuel efficiency, so the following method may be used.

Accordingly, when a hybrid vehicle runs on an upward slope for a predetermined time or more in a high elevated area, the controller 90 allows a sufficient amount of air to flow into the combustion chamber of the engine 10 in comparison to the requested torque and controls the idle RPM of the engine 10 by adjusting the time to ignite the fuel.

According to this method, the amount of air flowing into the combustion chamber is larger than the requested torque, so the amount of fuel flowing into the combustion chamber also increases in comparison to the requested torque. Accordingly, although it is disadvantageous in respect of fuel efficiency, it is possible to keep the torque for charging the battery 50 constant.

When a hybrid vehicle runs in a high elevated area, it is required to keep the idle RPM of the engine 10, using the method described above, in order to secure the ability of charging the battery 50.

The hybrid vehicle according to an exemplary embodiment of the present invention further includes an air-conditioning system for controlling the internal temperature of the vehicle. The air-conditioning system, which keeps the interior of a vehicle pleasant by maintaining the temperature of the interior at appropriate levels regardless of changes in external temperature, heats or cools the interior of a vehicle, using a refrigerant that is discharged from a compressor 60 and exchanges heat through an evaporator while circulating through a condenser, a receiver drier, an expansion valve, the evaporator, and the compressor 60.

In a hybrid vehicle, the compressor 60 is operated by a compressor motor 62. The compressor motor 62 is operated by the power from the battery 50.

The controller 90 determines whether a hybrid vehicle is running on an upward slope for a predetermined time or more, on the basis of a signal from the slope sensor 80 (S50).

When a hybrid vehicle is running on an upward slope for a predetermined time or more in a high elevated area, the controller 90 limits the power supplied to the compressor motor 62 from the battery 50 under a predetermined level. Limiting the power supplied to the compressor motor 62 under a predetermined level makes it possible to secure power to be supplied to the driving motor 30. Accordingly, it is possible to improve the uphill-driving ability and the fuel efficiency of a hybrid vehicle.

Further, when a hybrid vehicle is running on an upward slope for a predetermined time or more in a high elevated area, the controller 90 changes the shifting pattern of the hybrid vehicle (S60).

In general, when a hybrid vehicle runs on the ground at sea level, the shift gear is determined by the speed of the vehicle and torque requested by the driver.

However, when a hybrid vehicle runs in a high elevated area, relatively lower gears are used, as compared with when it runs on the ground at sea level. Accordingly, the torque of the engine 10 is increased and the other torque of the engine 10 except for the torque for driving is used to charge the battery 50. Therefore, it is possible to secure an ability of charging of the battery 50 and to improve roadability of a hybrid vehicle.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A control system of a hybrid vehicle, comprising:
an engine that generates power by burning fuel;
a driving motor that assists the power from the engine by generating power using electricity supplied from a battery;
an integrated starter-generator that starts the engine and charges the battery by operating selectively as a power generator;
an atmospheric sensor that measures atmospheric pressure;
a temperature sensor that measures a temperature of intake air flowing into the engine; and
a controller that calculates a control factor, using the atmospheric pressure measured by the atmospheric sensor and the temperature of intake air measured by the temperature sensor, and adjusts a State of Charge (SOC) charge band between an SOC where charging the battery is started and an SOC where a hybrid vehicle runs in a charge mode, in accordance with a magnitude of the control factor,
wherein the control factor is calculated by multiplying the atmospheric pressure by a pressure weight value and multiplying the temperature of the intake air by a temperature weight value.

2. The system of claim 1, wherein the pressure weight value is larger than the temperature weight value.

3. The system of claim 1, wherein the smaller the control factor than a standard control factor, the more the controller increases the SOC charge band step by step.

4. The system of claim 1, wherein: the controller increases power for charging the battery by increasing an idle RPM of the engine, when the control factor is smaller than a standard control factor.

5. The system of claim 1, wherein when the control factor is smaller than a standard control factor, the controller decreases an EV line, and the EV line is output torque for operating the engine in an EV mode in accordance with torque requested by a driver.

6. The system of claim 1, further comprising:

a slope sensor measuring an inclination of a vehicle; and an air-conditioning system including a compressor that compresses a refrigerant and a compressor motor that operates the compressor, in order to control the internal temperature of a vehicle, wherein when it is determined that the control factor is smaller than a standard control factor and a vehicle is running on an upward slope for a predetermined time or more through the slope sensor, the controller controls an idle RPM of the engine by adjusting a time to ignite fuel flowing into a combustion chamber of the engine, when the control factor is smaller than the standard control factor.

7. The system of claim 6, wherein when it is determined that the control factor is smaller than the standard control factor and a vehicle is running on an upward slope for a predetermined time or more through the slope sensor, the controller limits power supplied to the compressor motor from the battery under a predetermined value.

8. The system of claim 6, wherein when it is determined that the control factor is smaller than the standard control factor and a vehicle is running on an upward slope for a predetermined time or more through the slope sensor, the controller shifts to a lower gear.

9. A control method of a hybrid vehicle having an engine that generates power by burning fuel, a driving motor that assists the power from the engine by generating power using electricity supplied from a battery, and an integrated starter-generator, the method comprising the steps of:

measuring, by an atmospheric sensor, atmospheric pressure;

measuring, by a temperature sensor, a temperature of intake air flowing into the engine; and utilizing a controller to calculate a control factor, based on the atmospheric pressure measured by the atmospheric sensor and the temperature of intake air measured by the temperature sensor, and adjusting a State of Charge (SOC) charge band between an SOC where charging the battery is started and an SOC where a hybrid vehicle runs in a charge mode, in accordance with a magnitude of the control factor, wherein the control factor is calculated by multiplying the atmospheric pressure by a pressure weight value and multiplying the temperature of the intake air by a temperature weight value.

* * * * *